Nov. 24, 1964  D. L. SELHOST  3,158,083
BYPASS DAMPER CONSTRUCTION
Filed March 10, 1961  2 Sheets-Sheet 1
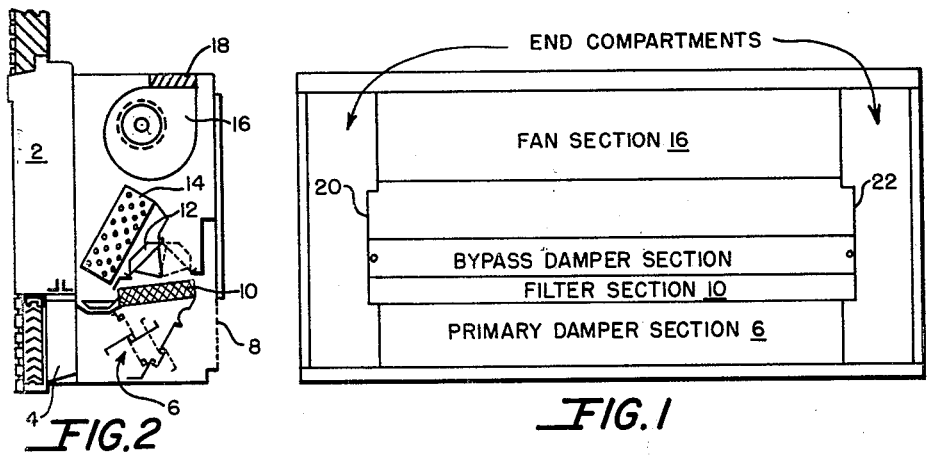
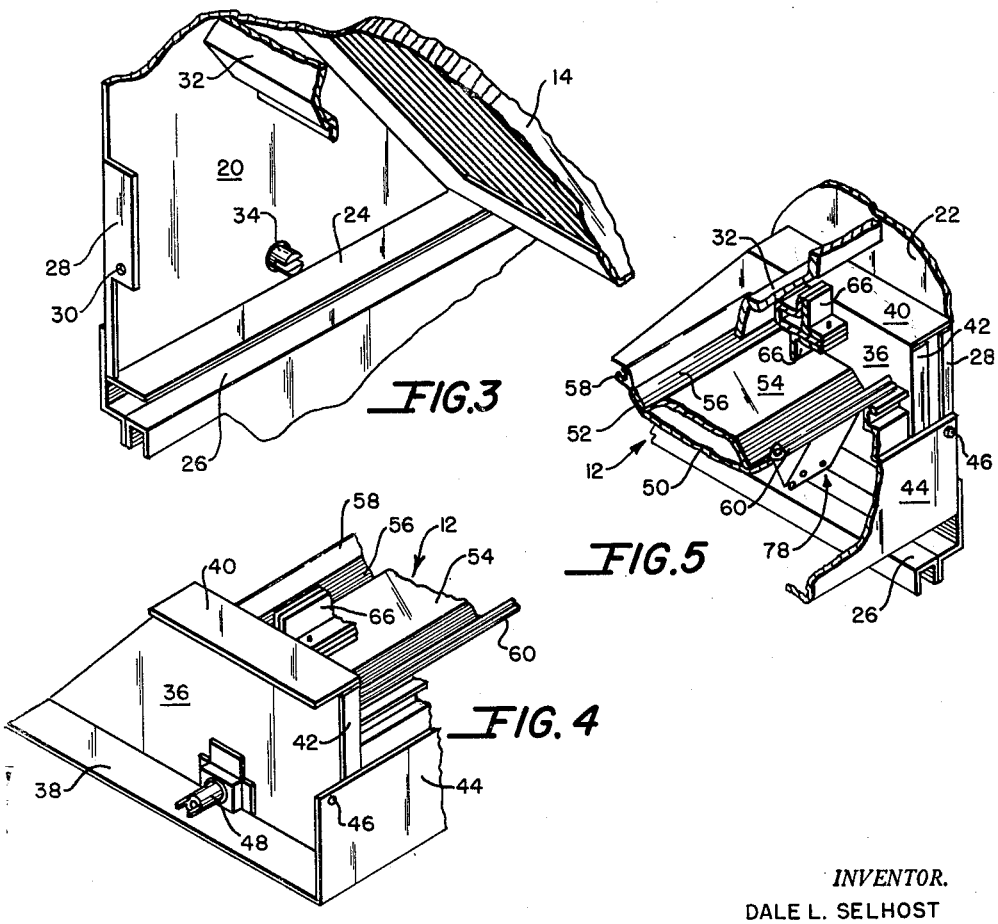
INVENTOR.
DALE L. SELHOST
BY
ATTORNEY Nov. 24, 1964 D. L. SELHOST 3,158,083

BYPASS DAMPER CONSTRUCTION

Filed March 10, 1961 2 Sheets-Sheet 2

INVENTOR.
DALE L. SELHOST

BY

*Edward C. Arens*

ATTORNEY

_United States Patent Office_

3,158,083
Patented Nov. 24, 1964

3,158,083
BYPASS DAMPER CONSTRUCTION
Dale L. Seihost, Rock Island, Ill., assignor to American Air Filter Company, Inc., Louisville, Ky., a corporation of Delaware
Filed Mar. 10, 1961, Ser. No. 94,744
4 Claims. (Cl. 98—38)

This invention relates generally to air conditioning apparatus and relates particularly to an improved bypass damper construction and arrangement for unit ventilators.

Baker et al. U.S. Patent 2,909,043, issued October 20, 1959, discloses a unit ventilator of the type having a by pass damper operable to control the proportions of air directed through and around a heat exchanger. When such a unit ventilator is operated as a so-called damper-controlled unit, temperature control of the air passed through the unit ventilator is effected, in accordance with the temperature demands of the space being heated or cooled, by varying the position of the bypass damper to vary correspondingly the proportions of air directed through and around the heat exchanger. One of the several salient advantages of the damper-controlled unit ventilator is that a throttle valve for varying the flow of the hot or chilled water to the heat exchanger is not required, the flow of water through the heat exchanger or coil being constant. However, if damper control without any valve control is to be used, it is important that the bypass damper seal tightly when it is in a position causing the air to flow around the coil. Failure to properly seal results in part of the air leaking past the damper and into heat exchanging proximity with the coil so that some loss of temperature control is experienced.

The problem of providing a damper which seals tightly increases with unit ventilators of substantial length, where the dampers may be as long as 6 feet. The damper should be sufficiently rigid that it does not twist along its length, but should not be reinforced to the point that its weight precludes using standard damper operators. Further, it is desirable that means be provided permitting adjustment of the damper sealing arrangement after the damper is made since in normal sheet metal fabrication normal tolerances may result in unsatisfactory seals.

Consequently, the object of this invention is the provision of a unit ventilator having an improved bypass damper arrangement.

In accordance with the invention, a bypass damper assembly which is readily separable as an integral unit from the unit ventilator is provided. The assembly carries means against which the contained bypass damper seals and provision is made to permit adjustment of the seals while the assembly is separated from the unit ventilator. Hence the adjustments may be conveniently made before the assembly is installed within the unit ventilators. The separable feature of the bypass damper assembly also permits a simplified adjustment of the sealing means at the installation site, and further permits generally unobstructed access to the face of the coil when desired.

The invention and its features will be further described in connection with the accompanying drawing wherein one embodiment incorporating the principles of the invention is shown by way of example, and wherein:

FIGURE 1 is an outline front view of a unit ventilator with the front panels removed;

FIGURE 2 is a partly diagrammatic, vertical sectional view of the unit ventilator in installed position, and showing the damper means in one extreme position in solid line form, and in an opposite extreme position in dotted line form;

FIGURE 3 is a fragmentary isometric view of the inner face of one vertical partition and adjacent parts illustrating the structural arrangement which receives one end of the bypass damper assembly;

FIGURE 4 is a fragmentary isometric view of the end of the bypass damper assembly which is received by the structure shown in FIGURE 3;

FIGURE 5 is a fragmentary isometric view showing the opposite end of the bypass damper assembly installed within the unit ventilator;

Figure 6:
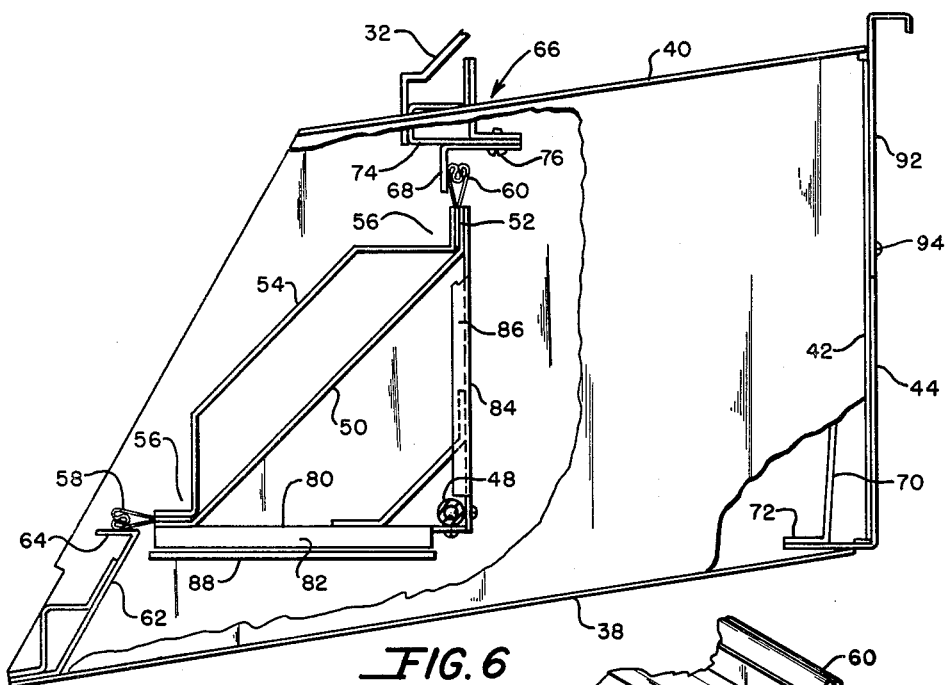
FIGURE 6 is a partly broken elevational view of the end of the bypass damper assembly shown in FIGURE 4.

Referring first to FIGURE 1, which carries legends designating the principal parts of the unit ventilator, and FIGURE 2, which shows these parts in diagrammatic section, the unit ventilator is typically floor-mounted with its rear side against an outside wall 2 having a louvered outdoor air inlet 4 for admitting outdoor air into the primary damper section 6 in the lower central portion of the unit. Room air is introduced into the primary damper section 6 as needed through a lower front room air inlet 8, or through other arrangements which need not be detailed here. When the primary dampers 6 are in the solid line positions outdoor air only is drawn into the unit. When the dampers 6 are in the dotted line positions room air only is drawn into the unit. As is well known in the art, the primary dampers 6 may be controlled in one or another cycle to admit the proper proportion of outdoor air and room air in accordance with the particular desire of the user.

The air admitted into the primary damper section of the unit is drawn upwardly through the air filter 10 and into the central portion of the unit which contains the bypass damper 12 and the heat exchanger or coil 14. If the bypass damper 12 is in one extreme position illustrated by the solid line outline in FIGURE 2, all of the air will be directed around the front of the coil 14. If the bypass damper is in the dotted line position, all of the air will pass through the coil 14 and be heated or chilled in accordance with the temperature character of the medium passing through the coil. If the bypass damper is in any position between the illustrated extreme positions, the proportions of air passing in one direction and the other will be in accordance with the position of the damper. The air so drawn through the unit ventilator by th fans 16 is then discharged through the fan outlet openings 18 into the room.

The principal parts of the unit ventilator thus far described are confined within the unit ventilator cabinet between opposite vertical partitions 20 and 22 spaced inwardly from the ends of the cabinet to define the inner sides of the end compartments as identified in FIGURE 1. The end compartments provide space for piping connections, temperature control components, fan motor, etc.

According to the invention, the bypass damper 12 is contained within a unitary bypass damper assembly which is adapted to be inserted in or removed from the unit ventilator in the fashion of a drawer. The assembly may be briefly described, in its general structure, as being in the form of a housing having a closed front wall and closed end walls, and with the bypass damper extending between the opposite end walls which carry the damper for rotation. Several cross members extending between the end walls include surface portions against which the longitudinal edge seals of the damper seat and give rigidity to the bypass damper assembly structure. The housing may be viewed as a structure having a bottom air inlet defined along opposite edges by the two lower cross members, and having separate air outlets defined along opposite edges by these two lower crossmembers plus an intermediate upper cross member.

To the end that the bypass damper assembly may be slid into its operative position within the unit ventilator in the fashion of a drawer, the inner face of each of the opposite vertical partitions is provided with structure which supports and properly positions the damper assembly in its operative position. As may be seen in FIGURE 3, a track in the form of a generally horizontal flange 24 projecting inwardly from the inner face of the left vertical partition 20 and extending from the front edge of the vertical partition rearwardly to the face of the coil 14 is provided to support the left end of the bypass damper assembly. Spaced several inches below flange 24, channel 26 extends rearwardly in parallel relation thereto, to provide, with the flange 24 and the intervening portion of the vertical partition 20, an inwardly open channel which receives one end of filter 10.

Along the front vertical edge of the vertical partition 20, an inwardly projecting flange 28 of limited height is provided. When the bypass damper assembly is installed, this flange 28 is lapped by the marginal end portion of the front wall of the assembly. A tapped hole 30 in flange 28 receives a screw which holds the bypass damper assembly in position. Dependent from the upper forward edge of coil 14 and extending across between the opposite vertical partitions 20 and 22 is a baffle 32, a fragmentary lower portion of which may be seen in FIGURE 3. A shaft having a slotted end coupling 34 on its inner end projects through the vertical partition 20 and is rotated by a damper operator to drive the bypass damper when the bypass damper assembly is slid into operative position.

FIGURE 4 shows that end (i.e., the left end) of the bypass damper assembly which is adapted to be received within the space defined by the structure of FIGURE 3. FIGURE 5 shows the right end of the damper assembly in installed relation within the unit ventilator and adjacent vertical partition 22. Since both ends of the bypass damper assembly, and the inner faces of both vertical partitions which receive the respective ends of the assembly, are essentially the same except that only one end of the bypass damper is driven, those parts in FIGURE 5 which correspond to the parts identified in FIGURES 3 and 4 are given the same identifying number.

The opposite end walls 36 of the bypass damper assembly each includes an outwardly directed horizontal flange 38 along its lower edge, an outwardly directed horizontal flange 40 along its upper or shorter edge, and an outwardly directed vertical flange 42 of reduced width extending along its front vertical edge. When the bypass damper assembly is slid into operative position within the unit ventilator, the lower flange 38 slides upon the track 24 (FIGURE 3), the upper flange 40 passes over the upper edge of flange 28 (FIGURE 3) and under the lower edge of baffle 32, and the upper end corner of the damper assembly lower front panel 44 laps the lower corner of flange 28 with the hole 46 of panel 44 being aligned with the hole 30 of flange 28. The bypass damper shaft 48 extends through the end wall 36 with a coupling on its outer end adapted to interengage with the complementary coupling 34 on the inner end of the drive shaft shown in FIGURE 3.

The bypass damper is shown in FIGURES 4 and 5 in an intermediate position which would cause part of the air to flow through the coil 14 and the other part to flow around it. In FIGURE 6 the damper is shown in a position preventing air flow through the coil. These FIGURES (4–6) will be referred to first in connection with the description of the bypass damper and sealing arrangement.

The bypass damper includes: a baffle or closure portion adapted to be displaced between opposite extreme positions for closing off air flow through the coil, or alternatively closing off air flow around the coil; means at each end of the damper for connecting the closure portion to the driving and idling shafts; longitudinal edge seals along the edges of the closure portion; and damper end seals for sealing the ends of the damper in a coil closing position. The closure portion of the bypass damper 12 includes a lower sheet 50 having longitudinal marginal edge portions 52 bent upwardly so that in cross section it appears as a shallow trough, an upper sheet 54 having a flat central portion of reduced width relative to the flat central portion of the lower sheet 50, and having a V-shaped configuration 56 so formed along each of its longitudinal marginal edges that the upper sheet 54 nests within the trough-shaped lower sheet 50 with the central flat portions of the two sheets spaced apart.

The longitudinal edge seals of the bypass damper are made from suitable strips of an air impervious material, such as woven glass fabric impregnated with silicone rubber, formed by stitching into generally heart-shaped sections secured along each of the longitudinal marginal edges of the bypass damper by sandwiching the extended point of the heart section between the marginal flanges 52 of the lower sheet and the V-shaped sections 56 of the upper sheet. The rear longitudinal seal is identified by the numeral 58 and the front longitudinal seal is identified by the numeral 60.

The horizontally disposed cross members against which the longitudinal edge seals 58 and 60 seat when the bypass damper is in opposite extreme positions are carried by the bypass damper assembly as integral parts thereof, and not only serve as sealing elements but also strengthen and give rigidity to the assembly. Referring to FIGURE 6 the rear cross member 62 includes an upper, rearwardly-directed flange portion 64 against which rear damper seal 58 seats when the bypass damper is in the FIGURE 6 position directing all of the air around the coil 14. The upper intermediate cross member assembly generally designated 66 includes a depending flange 68 against which front damper seal 60 seats when the damper is in the FIGURE 6 position, and against which the rear damper seal 58 seats when the damper is in the opposite extreme position. The front cross member 70 includes a rearwardly-directed flange 72 along its lower edge and against which the front damper seal 60 seats when the damper is in its position opposite that shown in FIGURE 6. It will be appreciated that each of the cross members extends across between the opposite end walls 36 of the bypass damper assembly and is suitably secured to these end walls so that the assembly has sufficient rigidity to permit normal handling thereof.

The upper cross member assembly 66 includes, besides the depending flange 68, structure adapted to engage the lower marginal edge of the baffle 32 when the assembly is installed in operative position. The structural member 74, which seats against the lower edge of baffle 32, is generally channel-shaped in cross-section and projects rearwardly so that the web of the channel abuts the baffle for the length of the channel. The relationship of the lower edge of baffle 32 and channel 74 when the damper assembly is in operative position is shown in FIGURE 6.

It is also noted that the depending flange 68 of the upper cross member assembly 66 is one leg of an angle, the other leg of the angle being secured to the remainder of the cross member assembly by screws 76 passing through laterally-elongated holes spaced along the length thereof. This arrangement of elongated holes permits the angle to be adjusted in a front-to-rear direction so that the depending flange or leg 68 can be accurately positioned for seating of the edge seals of the damper. Since the damper assembly is fabricated and subsequently installed as a separate unit, the adjustment of the depending flange 68 is made prior to insertion of the assembly into the unit ventilator. Consequently the adjustment is made under conditions permittting an accurate adjustment to be readily made.

Figure 7:
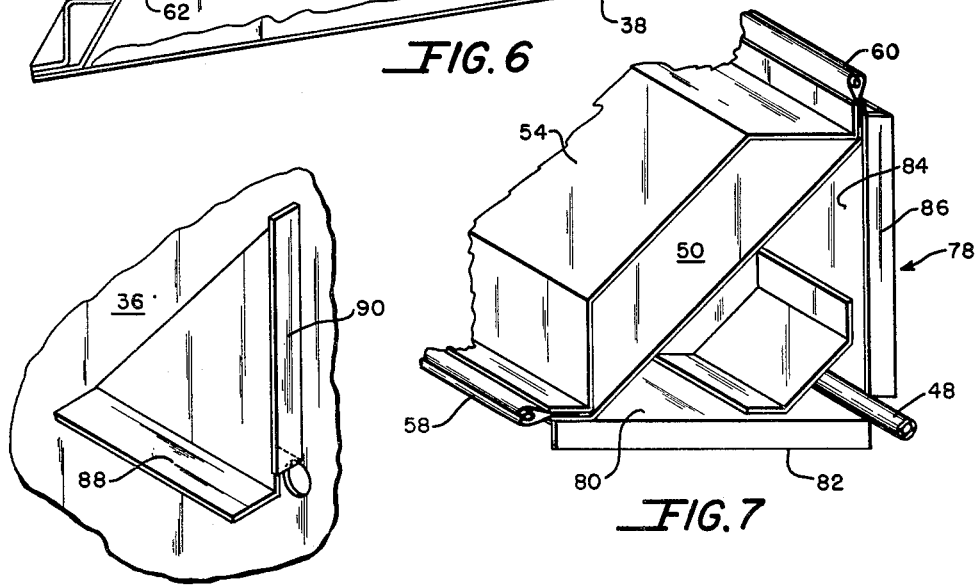
FIGURE 7 is a fragmentary isometric view of one end of the bypass damper.

Referring now to FIGURES 6 and 7, the connecting means between the closure portion of the damper and the shafts on which the damper pivots includes the generally V-shaped shells 78 secured to the closure portion and the respective shafts at each end of the damper. The V-shaped members have open faces adjacent the end walls 36, and the driving shaft 48 and opposite idler shaft are each fitted and secured in the apex of the Vs. The left and right end shells 78 are the same except for being disposed in mirror relation to each other so only the left shell (FIGURE 7) will be detailed to any extent.

Figure 8:
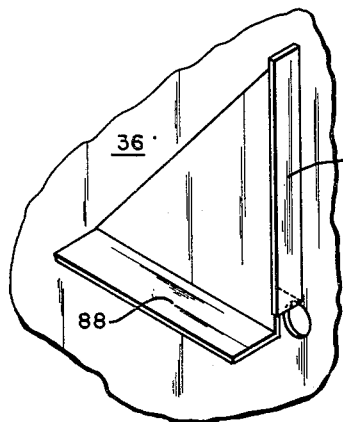
FIGURE 8 is a fragmentary isometric view of an interior face of the end wall of the bypass damper assembly illustrating the ledge arrangement against which the end of the bypass damper seals.

The rear face 80 of the shell carries a rearwardly-directed blade 82 along its edge adjacent the end wall of the damper assembly. The front face 84 of the shell carries a similar rearwardly-directed blade 86 but which is spaced outwardly slightly from the end of the damper. These blades 82 and 86 seal the ends of the damper when it is rotated to a position closing the face of the coil by seating on a ledge arrangement mounted on the inner faces of the end walls 36. Such a ledge arrangement is shown in FIGURE 8 and includes a generally horizontally-disposed ledge 88 of one width for receiving the blade 82 on its top face, and a generally vertically-disposed ledge 90 of lesser width for receiving the blade 86 against its front face. The ledges 88 and 90 may be provided with suitable gasketing material such as mohair strips to receive the edges of the blades.

In FIGURE 4 only the lower front panel 44 of the damper assembly is shown. The upper front of the damper assembly is closed by an upper front panel 92, the edge of which is shown in FIGURE 6. This upper panel is suitably secured to the lower panel 44 by sheet metal screws 94 which pass through the lower marginal portion of the upper panel and into the underlapping recessed upper portion of panel 44.

After the front of the damper assembly is closed by the two front panels 44 and 92, and assuming the adjustments of the sealing means had been made, the complete damper assembly is slid into the unit ventilator and bolted into place by the two bolts which pass through holes 46 (FIGURE 4) in the lower front panel 44.

In addition to the fact that the invention provides a bypass damper having a superior sealing arrangement, it also permits the entire bypass damper assembly to be removed readily to give improved access to the coil face and certain other interior components.

The bypass damper closure construction described (i.e., the trough-shaped members secured in opposing relation to form the damper closure portion) is such that the strength and rigidity of the damper is enhanced, and the hollow character of the closure provides insulation against heat pick-up when the damper closes off the coil face. The bypass damper assembly is, on the whole, relatively compact so that it may be used in units of limited height. Further, when the closure portion is in opposite extreme positions, the closure portion directs air flow in the proper direction without adding appreciable air flow resistance, or forming air pockets which cause undesirable turbulence.

The invention claimed is:

1. In a unit ventilator of the bypass damper type having a cabinet provided with air admission and air discharge openings:

opposite vertical partition means defining a central air passageway between said air inlet and air outlet means;

heat exchanger means disposed in said central air passageway to extend forwardly across a portion of said central air passageway;

a unitary bypass damper assembly including a housing having opposite end walls, separate from said vertical partition means, and a plurality of cross members extending between said opposite end walls to define a bottom air inlet and a first air outlet and a second air outlet, and a bypass damper disposed within said housing for displacement between opposite extreme positions selectively closing off said first and said second air outlets;

and means for releasably mounting said assembly in said central air passageway with said first air outlet connected to direct air passing therethrough to said heat exchanger means, and said second air outlet connected to direct air passing therethrough around said heat exchanger means;

said bypass damper includes a hollow closure portion formed of a pair of trough-shaped panels secured in opposed relation and carrying resilient sealing means along the opposite longitudinal edges.

2. Air conditioning apparatus of the character described including:

a cabinet having a heat exchanger and a bypass damper assembly mounted therein;

said bypass damper assembly being in the form of an integral unit separable from said cabinet as an integral unit, said damper assembly including a bypass damper housing including opposite end walls and a series of cross members holding said end walls in spaced-apart relation, said end walls being secured to the respectively opposite ends of a lower rear cross member, a lower front cross member, and an upper intermediate cross member to define between said lower rear and said lower front cross members a bottom air inlet, between said lower rear and said upper intermediate cross members a first air outlet, and between said lower front and said upper intermediate cross members a second air outlet, and a pivotally supported bypass damper having a longitudinal dimension extending between said opposite end walls, said bypass damper having longitudinal edges engaging said lower rear and upper intermediate cross members to close off said first air outlet in one extreme position, and said longitudinal edges engaging said lower front and upper intermediate cross members to close off said second air outlet in the opposite extreme position;

and ledge means in said cabinet for releasably mounting said damper housing in said apparatus in a disposition in which the air passing out of said first air outlet is directed through said heat exchanger, and the air out of said second air outlet is directed around said heat exchanger.

3. In the air conditioning apparatus of claim 2:

said upper cross member includes sealing flange means and means for adjusting the location of said flange means with respect to said lower cross members so as to obtain a better seal between said damper and said cross members.

4. In the air conditioning apparatus of claim 2:

said bypass damper comprises a pair of rectangular panels including at least one of which has a depressed portion, and means for securing the peripheral edges of said panels together with an insulating space between said panels.

References Cited by the Examiner

UNITED STATES PATENTS

| 1,990,110 | 2/33 | Bridges. | |
| 1,915,994 | 6/35 | Harnett | 98—38 |
| 2,909,043 | 10/59 | Baker | 98—38 |
| 2,971,450 | 2/61 | Millman | 98—38 |

FOREIGN PATENTS 1,215,287    4/60    France.

ROBERT A. O'LEARY, *Primary Examiner.*

CHARLES E. O'CONNELL, *Examiner.*